United States Patent [19]

Lowe

[11] Patent Number: 5,370,041

[45] Date of Patent: Dec. 6, 1994

[54] BEVERAGE MAKING APPARATUS CONTAINING A POTABLE WATER PURIFICATION UNIT

[76] Inventor: Stephen Lowe, 811 S. 6th St., Las Vegas, Nev. 89101

[21] Appl. No.: 72,087

[22] Filed: Jun. 7, 1993

[51] Int. Cl.⁵ .................. A47J 31/06; A47J 31/24
[52] U.S. Cl. .................... 99/286; 99/306; 210/282
[58] Field of Search ........... 99/279, 285, 286, 290, 99/298, 300, 304, 306, 307; 210/282

[56] References Cited

U.S. PATENT DOCUMENTS

| | | | |
|---|---|---|---|
| 3,844,206 | 10/1974 | Weber | 99/282 |
| 3,950,253 | 4/1976 | Stern | 210/282 |
| 4,889,041 | 12/1989 | Mahlich | 99/285 |
| 4,919,041 | 4/1990 | Miller | 99/279 |
| 5,120,437 | 6/1992 | Williams | 210/282 |

Primary Examiner—Robert W. Jenkins
Attorney, Agent, or Firm—Cleveland R. Williams

[57] ABSTRACT

The present invention resides in a beverage making machine containing a purification unit for purifying potable water. The purifying unit contains a purifying agent and is detachably mounted on either the water reservoir or on the basket where water contacts the brewing agent or beverage making agent of the beverage machine.

In an alternate mode, the water purifying unit is located below the water reservoir of a beverage making machine. The bottom member of the water purifying unit is detachably mounted on the bottom of said units with screw-on means.

20 Claims, 2 Drawing Sheets

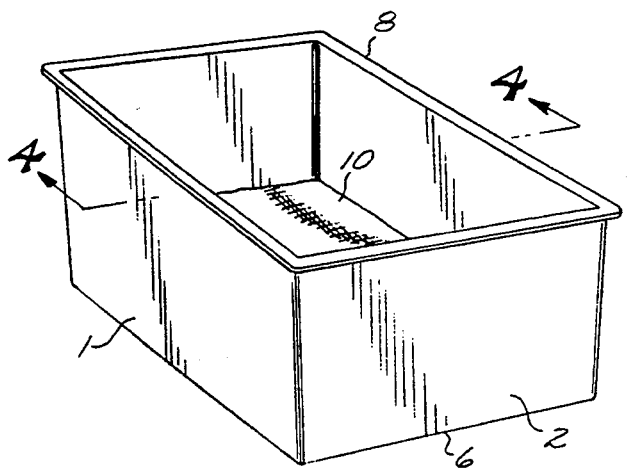
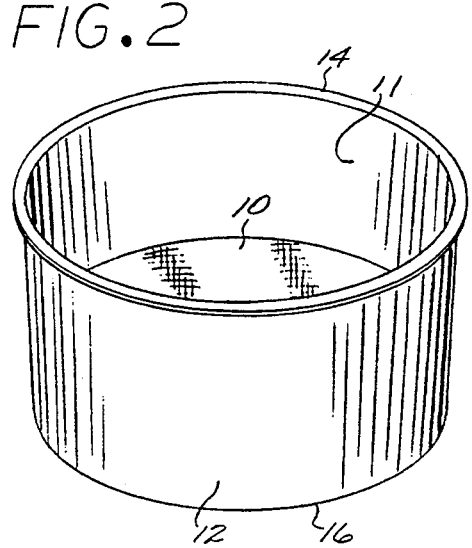
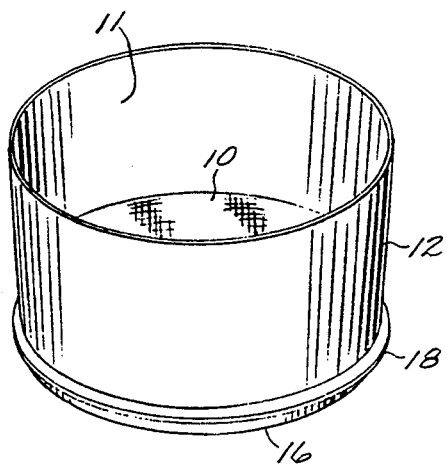
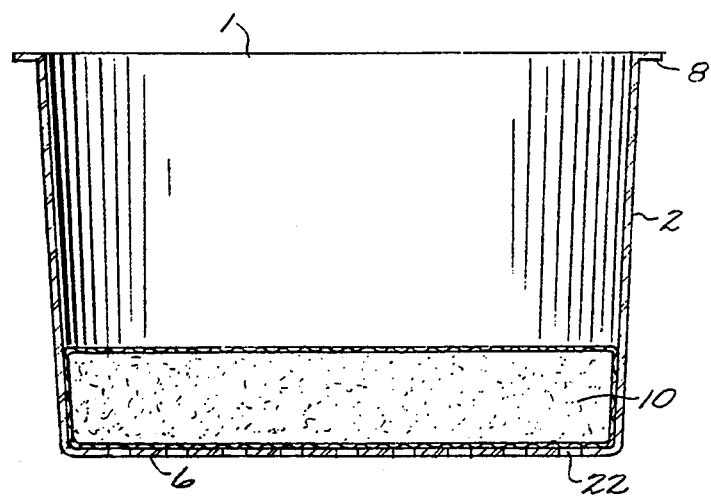

BEVERAGE MAKING APPARATUS CONTAINING A POTABLE WATER PURIFICATION UNIT

BACKGROUND OF THE INVENTION

1. Field of the Invention

This invention relates to a beverage making apparatus containing a potable water purification unit, including a purification agent, which is particularly suited for domestic use.

Water purification, as described herein, is the treatment of water to destroy possible disease causing biological agents; to eliminate organic matter that give rise to obnoxious odors, taste, or appearance; and to eliminate or reduce the concentration of potentially harmful chemicals.

Water usage is generally divided into three categories, namely, potable water, waste water, and reuse water. The current invention is primarily directed to beverage making machines, potable water and the purification thereof.

For purposes of identification and description herein, potable water is that water intended for human use, for example, drinking, cooking, etc. The source of this water may be runoff from rains collected in reservoirs, lakes and streams, or wells which tap subterranean water tables.

Most urban areas have municipal waste water facilities which treat and recycle waste water. Water treatment generally consists of five basic steps, namely, mixing with a coagulant, flocculation, clarification, filtration, and disinfection.

It should be noted that, many central water treatment plants, in particular small local operations, fail to adequately remove all contaminants or undesirable components that may be present in their respective water supplies.

Municipal waste water facilities which remove essentially all of the undesirable contaminants from potable water frequently suffer from the disadvantage of various contaminants being introduced into the water by the distribution system. These contaminants can effect taste, odor, turbidity and hardness of the water. Thus, a point-of-use water purification devise is highly desirable which will remove these undesirable components from and restore the potable water to a more aesthetically pleasing condition.

Previously, some domestic homes and business organizations have used both water purifying devices and beverage making machines to solve the problem of aesthetically unacceptable potable water. The use of a separate purifying device, however, suffers from the disadvantages of having to transport the water to the beverage making machine and/or an additional appliance taking up needed space in a kitchen area.

As can be determined from the foregoing, there is a need for a beverage making machine which contains as an integral part thereof, a water purifying unit which will eliminate the above-described disadvantages.

2. Description of the Prior Art

Presently, connoisseurs of pleasant tasting and aesthetically pleasing beverages suffer the disadvantage of poor taste and other undesirable characteristics associated with potable, tap water when said beverage is prepared from the potable water.

Efforts have been made previously to solve this problem. For example, U.S. Pat. No. 3,844,206, issued Oct. 29, 1974, relates to an infuser apparatus described as suitable for preparing coffee, tea or the like. The devise consists of a chamber for receiving a liquid, means for heating the liquid and a combined pressure relating and/or safety valve.

U.S. Pat. No. 3,950,253, issued Apr. 13, 1976 discloses a portable water purification and filtration apparatus which contains a reservoir for storing untreated water, a container for treating water and a water pump.

U.S. Pat. No. 4,119,019, issued Oct. 10, 1978, relates to a water filtering unit for coffee makers. The unit consists of a funnel-shaped receptacle containing sealing means consisting of a peripheral projecting compressible rib.

U.S. Pat. No. 4,528,095, issued Jul. 9, 1985, discloses a filtering system for potable water which consists of a stand, a basket-shaped filter. The filter is detachably mounted on an upper cantilevered branch of the stand.

U.S. Pat. No. 4,867,875, issued Sep. 19, 1989, relates to a combined water purifying beverage maker. The devise continuously circulates water under treatment between heating and purification apparatus U.S. Pat. Nos. 4,889,041, issued Dec. 26, 1989, and 4,969,393, issued Nov. 13, 1990, disclose an electric coffee or tea maker, steam iron, etc. which contain a water softening agent. The water softening agent either changes color or reduces its volume when its water softening capabilities are exhausted.

U.S. Pat. No. 5,038,675, issued Aug. 13, 1991, relates to a coffee or tea maker containing a fresh water container, a water filter and an outlet opening into a flow-through heater. The water filter is replaceable from the upper side of the fresh water container.

U.S. Pat. No. 5,076,922, issued Dec. 31, 1991, discloses a water-filtration apparatus which is described as suitable for reducing contaminants in tap water. The apparatus consists of a water container, a receiving reservoir mounted in said container, a filter associated with the reservoir, a first and second water passage and a first and second chamber associated with the water reservoir.

As can readily be determined from the foregoing, there is an ongoing research effort to produce new and novel apparatus which provide or restore potable water to a more aesthetically pleasing condition for use in a beverage making machine.

SUMMARY OF THE INVENTION

The present invention relates to a beverage making machine having potable water purification means which comprises: a portable water purifying unit constructed to receive potable water; said purifying unit having an inlet for adding potable water, inwardly sloping side walls, a peripheral lip located on the upper end of said side walls, a bottom wall having one or more drainage holes, a potable water purifying agent, including purifying means, superimposed on the top of the bottom wall, wherein said peripheral lip of the purifying unit curves around and rests on the shoulder of a potable water reservoir contained in the beverage making machine, said reservoir having a water inlet and outlet passage; and, means for transporting purified potable water to heating means and to a receptacle containing a beverage flavoring agent.

In an alternate mode, the peripheral lip of the purifying unit is located near the bottom portion of the side walls of said unit and the purifying unit is located either above or in the receptacle containing a beverage flavoring agent.

The invention, in addition resides in a beverage making machine containing a potable water purifying unit which comprises a vessel having a reservoir for receiving potable water. The reservoir contains side walls, a bottom wall, a water inlet for adding potable water to said reservoir and a water outlet passage located in said bottom wall. Conduit means is located between the bottom wall of the reservoir and a purifying unit located below the reservoir. The water purifying unit contains a water purifying agent, potable water purifying means, containment walls consisting of a top wall, side walls and a bottom wall to restrict and direct the flow of potable water, a water inlet and a water outlet. The bottom wall has a removable closure with sealing means.

Conduit means is located between the purifying unit and heating means, for transporting purified potable water, wherein the conduit means contains a thermal expansion unit to compensate for temperature changes therein.

Finally, transportation means is located between the heating means and a receptacle for receiving purified potable water, wherein said receptacle contains a beverage flavoring agent.

BRIEF DESCRIPTION OF THE DRAWINGS

The invention is further described by reference to the appended drawings taken in conjunction with the following description where:

FIG. 1. is a frontal perspective drawing of a rectangular, potable water purifying unit having a mating, peripheral lip located near the upper end of the side walls.

FIG. 2. is a frontal perspective drawing of a circular, potable water purifying unit having a mating, peripheral lip located near the upper end of the circular wall.

FIG. 3. is a frontal perspective drawing of FIG. 2., with the exception that the mating, peripheral lip is located near the bottom of the circular wall.

FIG. 4. is a longitudinal (vertical) cross-sectional view taken along the center line of a potable water purifying unit showing slightly inwardly sloping sides, a potable water purifying agent and drainage holes in the bottom wall of said unit.

DETAILED DESCRIPTION OF THE INVENTION

Figure 5:
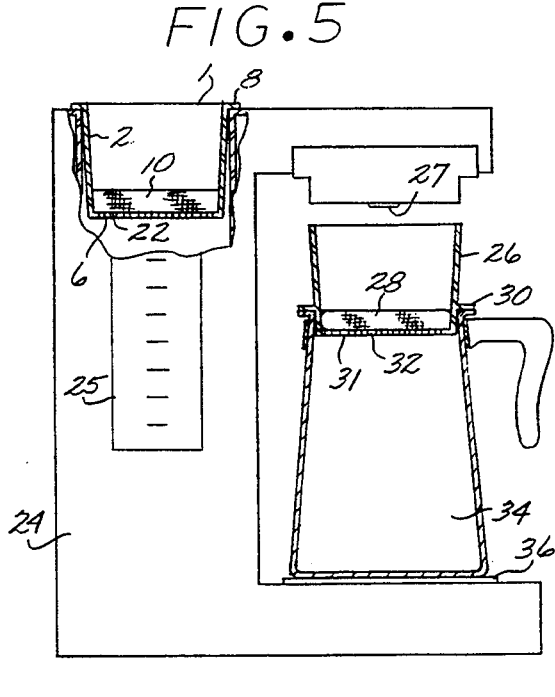
FIG. 5. is a partial cut-away view of beverage making apparatus containing a rectangular potable water purifying unit, including a purifying agent, mated with the upper portion of a water reservoir therein. The peripheral lip of the purifying unit is located near the top of the unit's side walls.

This invention resides in a beverage making apparatus containing a new and novel purification unit for purifying potable water.

The potable water purification unit shown in FIG. 1. shows a perspective drawing of rectangular shaped purification unit 1 viewed along line 4—4, containing side walls 2. Generally, there are four side walls 2, which connect with each other, forming a barrier for potable water. Preferably, side walls 2 slope inwardly to facilitate the passage of water through the unit. Connected to side walls 2 is bottom wall 6 which forms a support for purification agent 10. Near the top of side walls 2 is peripheral lip 8 which extends around the perimeter of side walls 2. Peripheral lip 8 mates with the top boundary of the water reservoir of a beverage making machine. It should be noted that potable water purification unit 2 can have a square configuration instead of the rectangular configuration depicted in FIG. 1.

FIG. 2. shows a potable water purification unit 12 which has a circular configuration. In FIG. 2., bottom wall 16 forms a support for purification agent 10 and connects to circular side wall 11. Peripheral lip 14 is located near the top of circular wall 11 and extends around the perimeter of said circular wall.

FIG. 3. is an alternate embodiment of the water purification unit depicted in FIG. 2. wherein peripheral lip 18 is located near the bottom of circular wall 11 and extends around the perimeter of said circular wall.

It is to be understood that the peripheral lip of the potable water purification units herein can be located near either the top or bottom of the side walls of the water purification units, in accordance with the beverage apparatus manufacturer's specifications.

FIG. 4. is a cross-section view of FIG. 1. In particular, potable water purification unit 1 is a cut-away view showing side wall 2, bottom wall 6 and peripheral lip 8 located near the top of side wall 2. Bottom wall 6 has one or more openings 22 which allow purified potable water to drain therethrough. Preferably, bottom wall 6 has multiple openings 22. Potable water purification agent 10 is preferably those water purification agents which effectively remove undesirable agents from potable water. Representative purification agents which are suitable for use herein include activated carbon, activated silica, greensand, synthetic zeolites, polystyrene resins, alum, ferric sulfate, potassium permanganate, diatomaceous earth, bentonite clays, sodium aluminate, calcium carbonate, sodium silicate, sodium carbonate and sodium chloride and mixtures thereof.

Activated carbon is the preferred purifying agent 10 herein. Sources for activated carbon include wood, bituminous coal, coconut shells, lignite, peat, bones, pecan shells, petroleum base residues and pulp mill black ash to name a few.

The activation process consists of the source materials being carbonized under controlled conditions, the resulting carbon (charcoal) being treated with an oxidizing gas such as steam or air at elevated temperatures.

Greensand is produced from naturally occurring compositions by open pit mining said material, followed by washing, screening and treatment with caustic to remove clay. Further treatment with alum, silicates and other salts produces a durable greenish-black mineral which is relatively inert except for its ion-exchange properties.

Synthetic zeolites are formed by mixing and reacting together solutions of sodium silicate and sodium aluminate under such conditions that precipitates do not form. The reaction mass is allowed to set into a homogenous gel, dried, crushed and activated by calcination. Various metals may be added to the zeolite to enhance its water purification properties.

Polystyrene resins are produced by the polymerization of styrene and divinyl benzene. Normally the resins form spheres of from about 0.45 to about 0.5 mm in size.

Preferably, the water purification agents 10, herein, are either in solid powdered form or solid granulated form. Generally, said water purification agents have a mesh size of from about 28 to about 70.

For reasons of convenience and to insure the integrity of the purification agents, it may be desirable to inclose said agent in a mesh screen or water permeable membrane. The mesh size of the screen will, of course, be smaller than the mesh size of the water purification agent. Water permeable membranes by definition have very small pore openings. The use of a mesh screen or water permeable membrane will ensure the rapid addition of the water purification agent to or removal from the water purification unit.

In FIG. 5., potable water purification unit 1 from FIG. 1. (rectangular configuration) is supported at the top of water reservoir 25 of beverage making apparatus 24 by peripheral lip 8. Potable water is poured into water purification unit 1, where under the influence of gravity and constrained by side walls 2, the potable water contacts water purification agent 10. Water purification agent 10 is supported by bottom wall 6 which has multiple openings 22. The purified water passes through the bottom wall via openings 22 into reservoir 25 of beverage making apparatus 24.

The purified water is heated using conventional beverage making apparatus heating means and transported utilizing conventional transport means to beverage apparatus opening 27, where said heated and purified water is discharged into beverage receptacle 26. The heated and purified water contacts beverage flavoring agent 28 and passes through bottom wall 31 via openings 32 into beverage reservoir 34. It should be noted that beverage receptacle 26 is supported near the top portion of beverage reservoir 34 by lip 30.

Suitable beverage flavoring agents include coffee or tea. It is to be understood, however, that other beverage flavoring agents which are conventional in the beverage making industry may be substituted for the above-defined coffee or tea. The flavored beverage is maintained at the desired temperature by heating pad 36.

Figure 6:
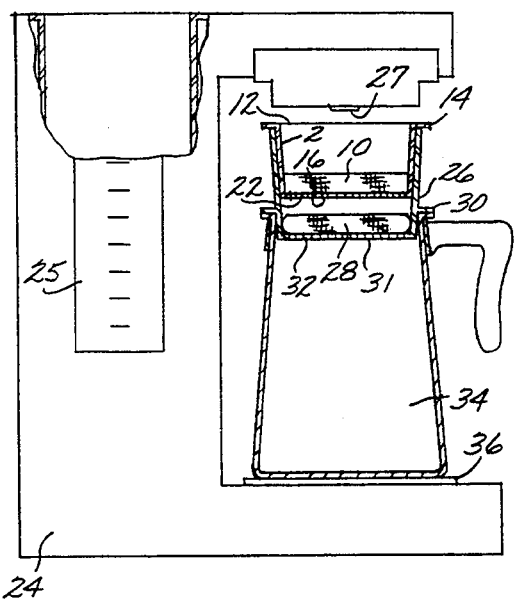
FIG. 6. is a partial cut-away view of a beverage making apparatus containing a circular potable water purifying unit mated with the upper portion of a receptacle containing a beverage making agent.
Figure 8:
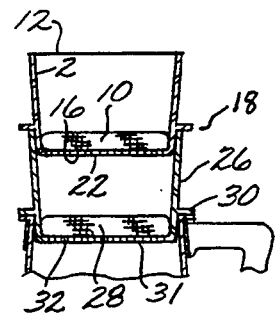
FIG. 8 is a cut-away view of FIG. 6 with the exception that the lip of the purification unit is located near the bottom portion of said unit.

FIG. 6. is an alternate embodiment of FIG. 5. wherein purification unit 12 (circular configuration) is utilized. In FIG. 6, potable water is poured into water reservoir 25 of beverage making apparatus 24, where it is heated using conventional heating means and transported, using conventional transportation means, to water discharge opening 27.

Heated, potable water is, next, discharged into water purification unit 12 (circular configuration) where it contacts purification agent 10. Water purification unit 12 is supported on the top portion of beverage receptacle 26 by peripheral lip 14.

After contacting purification agent 10, purified water drains through bottom wall 6 via multiple openings 22 and is discharged into beverage receptacle 26. The purified water contacts beverage flavoring agent 28 and is discharged through openings 32 of bottom wall 31 into beverage reservoir 34. The flavored beverage is maintained at the desired temperature by heating pad 36.

Figure 7:
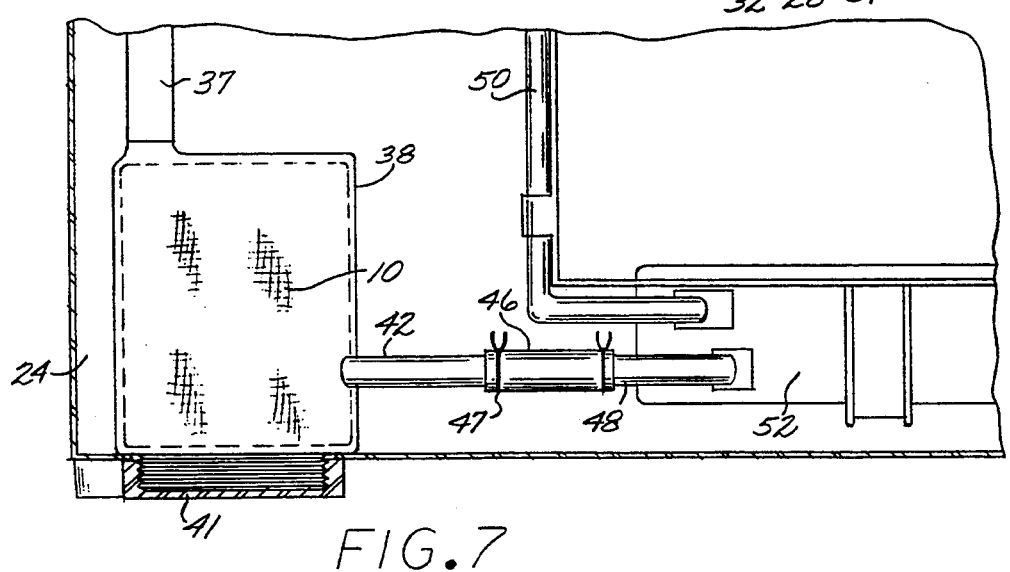
FIG. 7. is a cut-away frontal view of a beverage making apparatus which depicts an alternative embodiment of the present invention, wherein the potable water purifying unit is located below the water reservoir therein.

FIG. 7. is yet another embodiment of the potable water purification unit herein. Particularly, FIG. 7. is a cut-away view of beverage making apparatus 24 in FIGS. 5 and 6, wherein the water purification unit 38 is located below the water reservoir. Potable water from the water reservoir enters water purification unit 38 via conduit 36 under the influence of gravity. Potable water contacts water purification agent 10 where it is purified.

Water purification unit 38 can be either rectangular, square or circular in configuration, depending upon the specification of the manufacturer of the beverage making apparatus.

Water purification unit 38 is equipped with a bottom connecting member 41 which has screw-off and screw-on means. Bottom connecting unit 38, additionally, is equipped with sealing means, for example, an o-ring or a gasket. Conventional gaskets in the beverage making technology are suitable for use herein. An example of suitable screw-on means, is mating screw threads on the bottom of purification unit 38 and on bottom connecting member 41. The screw-on means of bottom connecting member 41, engage, screw onto and mate with the screw threads on the bottom of purification unit 38, forming a liquid-tight seal therewith.

Next, purified water is transported via conduit 42 through heat expansion conduit means 46 and conduit 48 to electric heating means 52, where said water is heated to the desired temperature. Heat expansion conduit means 46 is equipped with fastener 47 to provide a leakproof seal. Conventional materials such as rubber, plastic, etc., and fasteners are suitable for use in the construction of heat expansion conduit means 46.

Heated water from electric heating means 52 is transported via conduit 50 to beverage receptacle 26, for example, as in FIGS. 5 and 6. From this point on, the beverage is produced in accordance with the descriptions in FIGS. 5 and 6.

Obviously, many modifications and variations of the invention, as hereinbefore set forth, may be made without departing from the spirit and scope thereof, and therefore, only such limitations should be imposed as are indicated in the appended claims.

I claim:

1. A beverage making machine having potable water purification means which comprises:

a potable water purifying unit constructed to receive potable water, said purifying unit having an inlet for adding potable water, inwardly sloping side walls, a peripheral lip located near the upper portion of said side walls, a bottom wall connected to the side walls and having one or more drainage holes, a potable water purifying agent superimposed on the top of the bottom wall, including water purification means; wherein said peripheral lip of the water purifying unit curves around and rests on the shoulder of a water reservoir contained in the beverage making machine, said reservoir having a water inlet and outlet passageway; means for transporting purified water to heating means and to a beverage receptacle containing a water inlet and outlet for heated, purified water and a beverage flavoring agent; wherein said beverage receptacle is supported by a beverage collecting vessel located beneath the outlet of the beverage receptacle.

2. The beverage making machine according to claim 1, wherein the peripheral lip of the purifying unit is located near the bottom portion of the side walls.

3. The beverage making machine in accordance with claim 1, wherein the bottom wall contains a plurality of drainage holes.

4. The beverage making machine according to claim 1, wherein the water purifying agent is a member selected from the group consisting of activated carbon, activated silica, greensand, synthetic zeolites, polystyrene resins, alum, potassium permanganate, diatomaceous earth, bentonite clays, sodium aluminate, calcium carbonate, sodium silicate, sodium carbonate and sodium chloride, and mixtures thereof.

5. The beverage making machine according to claim 1, wherein the water purifying agent is activated carbon.

6. The beverage making machine according to claim 1, wherein the water purifying unit has a rectangular configuration.

7. The beverage making machine in accordance with claim 1, wherein the water purifying unit has a circular configuration.

8. The beverage making machine according to claim 1, wherein the water purifying unit has a square configuration.

9. The beverage making machine according to claim 1, wherein the beverage making agent is selected from coffee beans or tea leaves.

10. A beverage making machine containing a potable water purifying unit which comprises:

a water reservoir for receiving potable water, said reservoir having a water inlet and outlet passageway, means for transporting potable water to heating means and to a potable water purifying unit, wherein said potable water purifying unit has an inlet for adding potable water, side walls, a peripheral lip located near the lower portion of said side walls, a bottom wall connected to the side walls and having one or more drainage holes, a potable water purifying agent superimposed on the top of the bottom wall, including water purification means; wherein said peripheral lip of the water purifying unit rests on the shoulder of a beverage receptacle, said beverage receptacle having a water inlet and outlet, side walls, a bottom wall connected to the side walls, a beverage flavoring agent superimposed on the top of the bottom wall and a lip near the bottom of the side walls which rests on the top of a beverage collecting vessel.

11. The beverage making machine according to claim 10, wherein the water purifying unit has a circular configuration.

12. The beverage making machine according to claim 10, wherein the purifying agent is activated carbon.

13. The beverage making machine according to claim 10, wherein the beverage flavoring agent is selected from coffee beans or tea leaves.

14. A beverage making machine containing a potable water purification unit which comprises:

a water reservoir for receiving potable water, said reservoir having a water inlet and outlet passageway, conduit means for transporting potable water from the reservoir to a water purification unit located below the water reservoir, wherein said water purification unit has an inlet and outlet passageway for potable water, a top wall, side walls, and a bottom connecting member having screw-on, screw-off and sealing means; a potable water purifying agent contained in the water purifying unit, including water purification means; and transportation means for transporting purified water to heating means and to a beverage receptacle which contains a beverage making agent.

15. The beverage making machine according to claim 14, wherein the screw-on means comprise mating threads.

16. The beverage making machine according to claim 14 wherein the purification unit has a rectangular configuration.

17. The beverage making machine in accordance with claim 14, wherein the purification unit has a square configuration.

18. The beverage making machine in accordance with claim 14, wherein the purification unit has a round configuration.

19. The beverage making machine according to claim 14, wherein the purifying agent is activated carbon.

20. A beverage making machine having potable water purification means which comprises:

a potable water purifying unit constructed to receive potable water, said purifying unit having an inlet for adding potable water, inwardly sloping side walls, a peripheral lip located near the bottom portion of said side walls, a bottom wall connected to the side walls and having one or more drainage holes, a potable water purifying agent superimposed on the top of the bottom walls, including water purifications means; wherein said peripheral lip of the water purifying unit curves around and rests on the shoulder of water reservoir contained in the beverage makings machine, said reservoir having a water inlet and outlet passageway; means for transporting purified water to heating means and to a beverage receptacle containing a water inlet and outlet for heated, purified water and a beverage flavoring agent; wherein said beverage receptacle is supported by a beverage collecting vessel located beneath the outlet of the beverage receptacle.

* * * * *